March 10, 1953

J. W. LEWIN 2,630,728

CENTERLESS METALWORKING FIXTURE

Filed Oct. 30, 1948

INVENTOR.
Jacob W. Lewin
BY
Carlson, Pitzner, Hubbard & Wolfe
ATTORNEYS

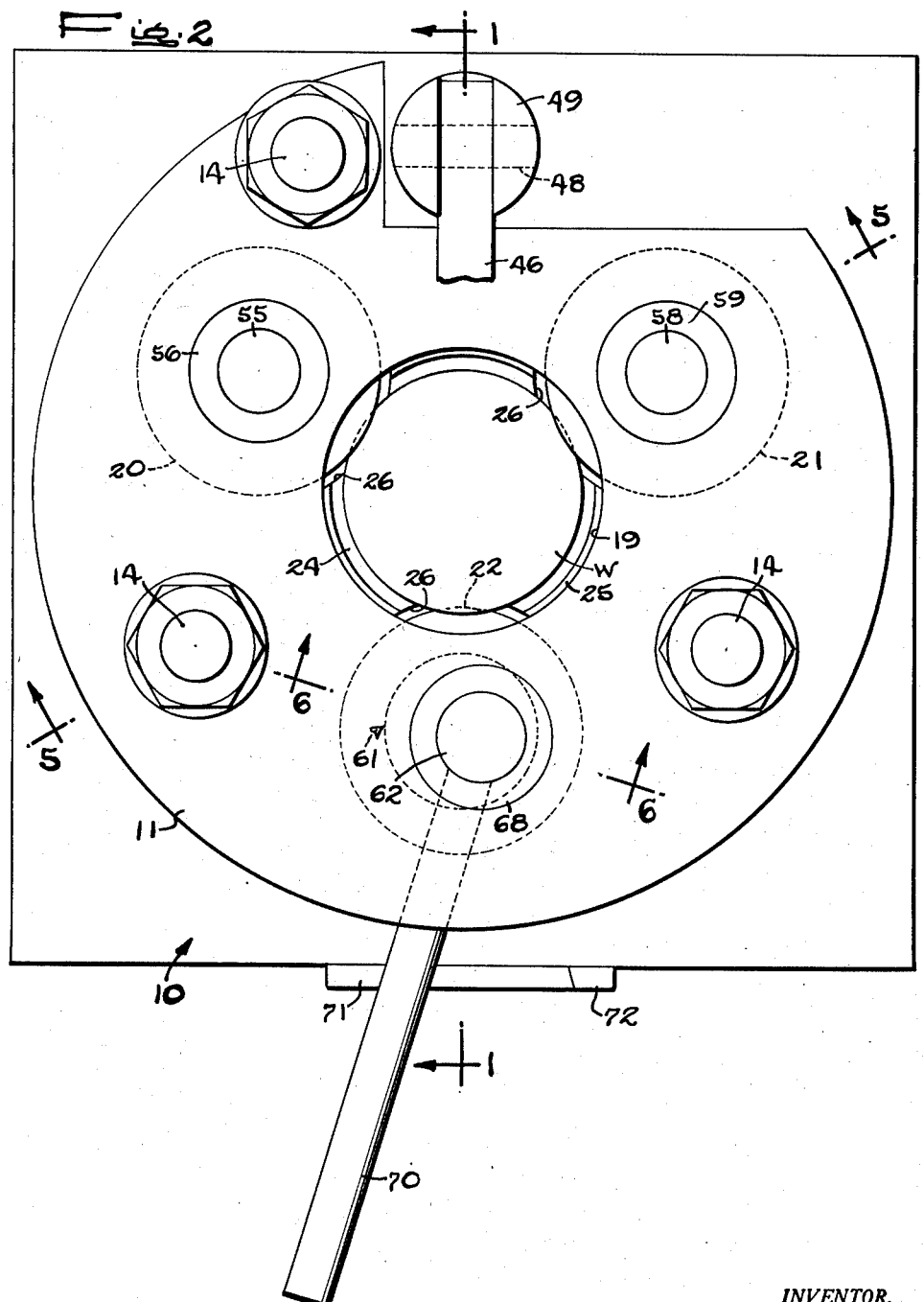

March 10, 1953  J. W. LEWIN  2,630,728
CENTERLESS METALWORKING FIXTURE
Filed Oct. 30, 1948  4 Sheets-Sheet 3
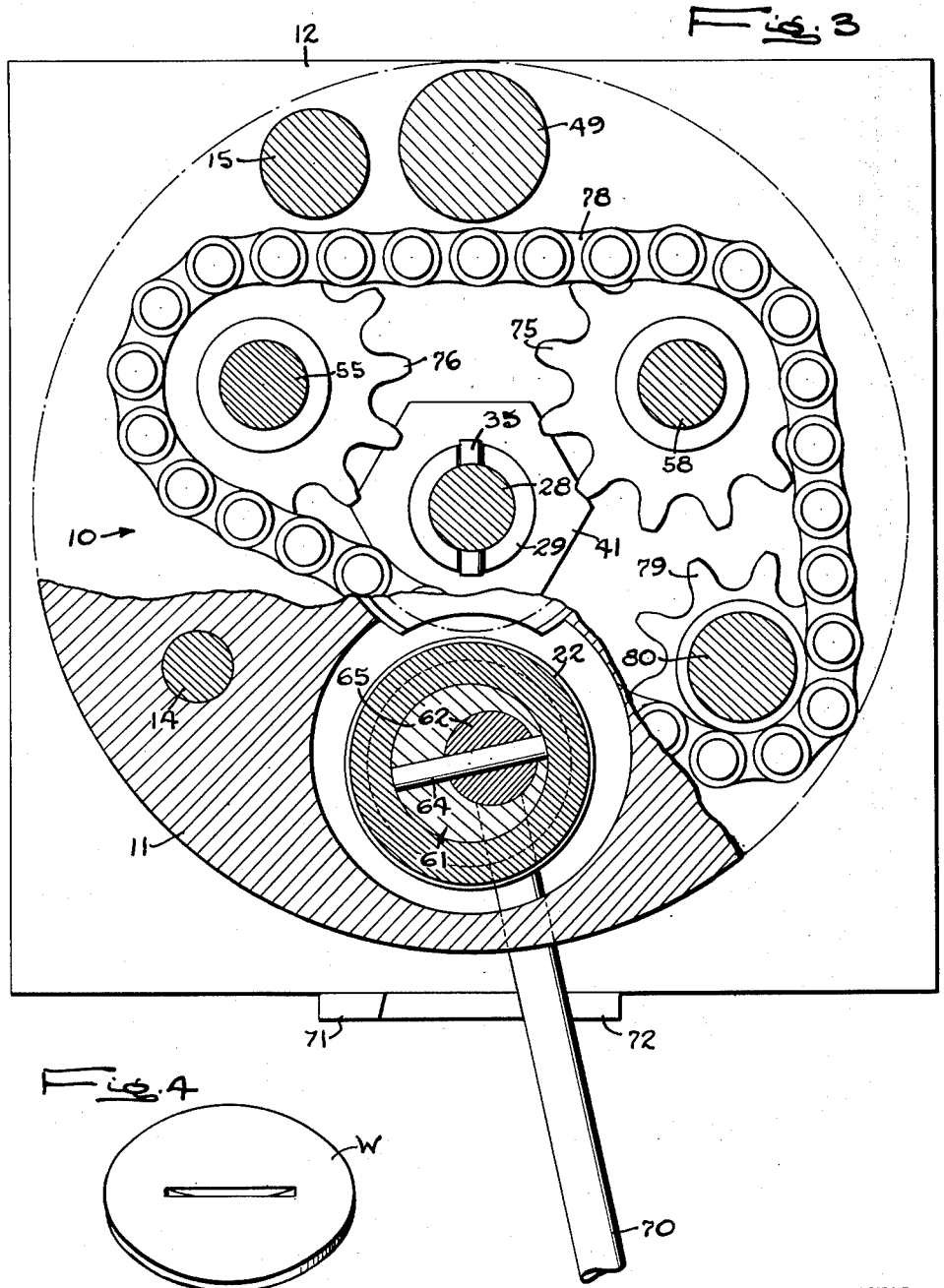
INVENTOR.
Jacob W. Lewin
BY
Carlson, Pitzner, Hubbard + Wolfe
ATTORNEY March 10, 1953  J. W. LEWIN  2,630,728
CENTERLESS METALWORKING FIXTURE
Filed Oct. 30, 1948  4 Sheets-Sheet 4
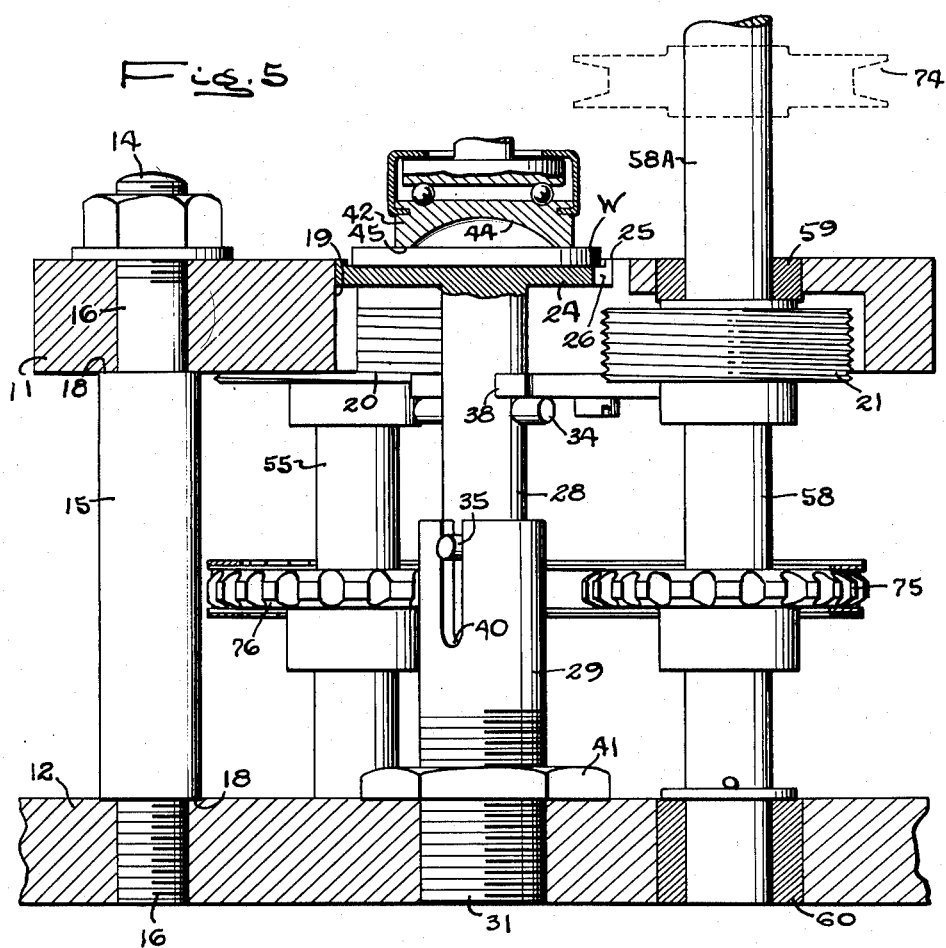
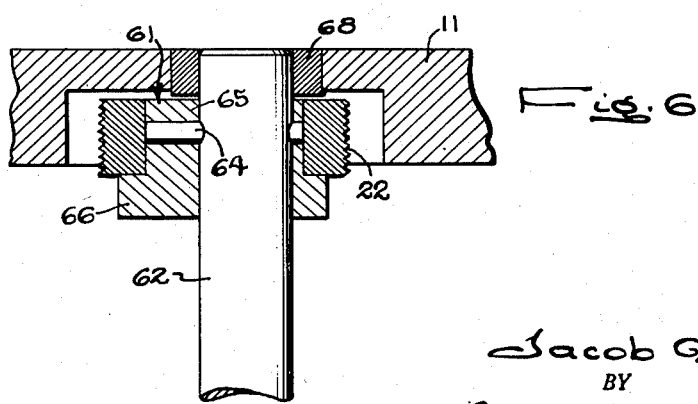
INVENTOR.
Jacob W. Lewin
BY
Carlson, Pitzner, Hubbard & Wolfe
ATTORNEYS Patented Mar. 10, 1953

2,630,728

UNITED STATES PATENT OFFICE 2,630,728

CENTERLESS METALWORKING FIXTURE

Jacob W. Lewin, Oak Park, Ill.; Lillie E. Lewin, administratrix of said Jacob W. Lewin, deceased Application October 30, 1948, Serial No. 57,573

7 Claims. (Cl. 80—6)

The present invention relates generally to devices for positioning a workpiece relative to a tool and, more specifically, to a novel device for holding a workpiece of circular cross section during the performance of a machining operation over its entire outer periphery. The invention finds particular but by no means exclusive utility in connection with the forming of threads along the entire outer periphery of such a workpiece.

The problem of threading or otherwise machining the outer peripheries of workpieces with circular cross sections has received considerable attention in the past. A number of different solutions have been proposed, meeting with varying degrees of success. On a conventional lathe, for example, such an operation would ordinarily be performed in two steps. Thus the workpiece would be gripped first at one end and machined over a portion of its length. The piece would thereupon be reversed, gripped by its other end, and then machined over the remainder of its length. An arrangement of this kind is acceptable for use on workpieces of considerable length in spite of the fact that it entails the expense of making two complete set-ups. To machine a flat disk-shaped workpiece in this manner would, however, be highly impracticable. Moreover, to machine such a workpiece with even passable success by the use of an ordinary lathe would require a specialized set-up involving substantial expense. Holding a disk-shaped workpiece with a magnetic chuck is fairly satisfactory in some instances but is subject to a serious limitation in that such an arrangement is totally unsuited for use with non-ferrous materials.

Accordingly, one object of the present invention is to provide a novel centerless metalworking fixture for permitting the effective machining of the outer peripheries of circular workpieces and particularly those of flat disk shape.

Another object is to provide a fixture of the foregoing character which will be both simple and inexpensive yet susceptible of surprisingly high production.

A further object is to provide a device of the above type wherein the workpiece will be positioned with sufficient nicety and precision to insure the performance of accurate work.

Other objects and advantages will become apparent as the following detailed description proceeds, taken in connection with the accompanying drawings, wherein:

Fig. 2 is a fragmentary plan view of the device of Fig. 1 with the latter in an operative condition.

Fig. 3 is a broken horizontal sectional view taken in the plane of the line 3—3 in Fig. 1.

Fig. 4 is a perspective view of a disk-shaped workpiece of the type which the device of Fig. 1 is adapted to accommodate.

Fig. 5 is a fragmentary vertical sectional view through the device of Fig. 1, such view being taken in the plane of the line 5—5 in Fig. 2.

Fig. 6 is a fragmentary vertical sectional view through one of the threading dies, being taken in the plane of the line 6—6 in Fig. 2.

Figure 1:
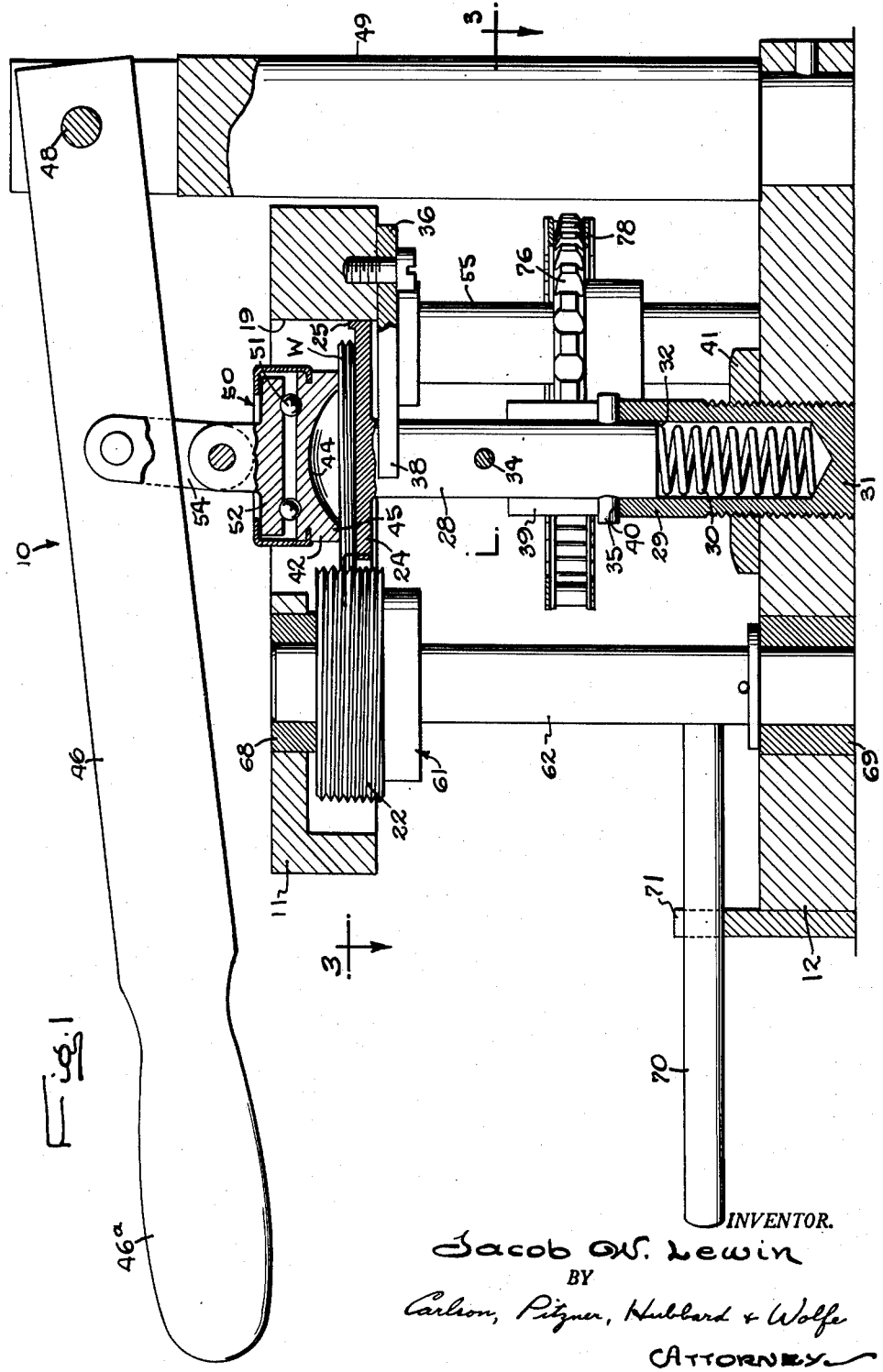
Fig. 1 is a vertical sectional view through an illustrative jig embodying the present invention, such view being taken in the plane of the line 1—1 in Fig. 2.

While the invention is susceptible of various modifications and alternative constructions, a preferred embodiment has been shown in the drawings and will be described below in considerable detail. It should be understood, however, that there is no intention to limit the invention to the specific form disclosed, but on the contrary, the intention is to cover all modifications and alternative constructions falling within the spirit and scope of the invention as expressed in the appended claims.

Referring more specifically to the drawings, the invention is there exemplified in an illustrative metalworking fixture 10 of the centerless type and adapted to hold a workpiece W so that threads may be formed along the entire length of its outer periphery. In the present instance, the fixture 10 is organized upon a frame comprising a pair of upper and lower body plates 11, 12, maintained in spaced-apart parallel relation as by means of a series of spacer bolts 14. Each of the latter is formed with a central body portion 15 of somewhat larger diameter than its threaded end portions 16, thereby defining a pair of annular locating shoulders 18 for the body plates 11, 12. To accommodate the workpiece W, the upper body plate 11 is formed with a central aperture 19 of substantially greater diameter than the workpiece W and into which a series of metalworking dies 20, 21 and 22 project, certain of the latter being rotatably driven from an appropriate power source. Each of the dies 20, 21 and 22 is of generally cylindrical shape, being made of hardened material and in this instance having raised spiral thread convolutions on its outer periphery for rolling threads into the workpiece W which is of somewhat softer material. The plate 11 is, of course, fashioned with circular recesses for housing these dies.

For the purpose of supporting the workpiece W within the central aperture 19, there is provided a flat platform 24 (Figs. 1, 2 and 5) of slightly smaller diameter than the opening 19 and bordered by a retainer rib 25. The latter is interrupted by a series of circumferentially spaced arcuate notches 26 in the edge of the platform 24 to provide clearance for the threading dies, 20, 21 and 22.

To permit movement of the platform 24 axially of the aperture 19 between an inoperative position above the threading dies and an operative position at about the medial horizontal plane of such dies, the platform 24 is formed with an integrally connected plunger 28 (Figs. 1 and 5). The latter depends vertically from the underside of the platform 24, its lower end portion being slidably housed within an upstanding guide sleeve member 29 threadedly mounted on the lower body plate 12. The downward force due to the weight of the workpiece W, the platform 24, and the plunger 28 is opposed by the action of a helical biasing spring 30 which is confined within the sleeve 29 between the latter's closed lower end 31 and the bottom face 32 of the plunger. The spring 30 is preferably of sufficient strength to normally maintain in the inoperative position the platform 24 together with the workpiece W.

In order to define the operative and the inoperative positions of the platform 24, the plunger 28 is equipped with a pair of longitudinally spaced stop members which are preferably in the form of diametrically extending pins 34, 35. A stationary stop abutment for engagement with the pin 34 is provided in the form of a stop plate 36 (Figs. 1 and 5) rigidly secured to the underside of the body plate 11 and having bifurcated end portions 38 straddling the plunger 28. A stop abutment for the lower pin 35 may conveniently be fashioned by milling a pair of diametrically opposed longitudinal slots 39 adjacent the upper end of the sleeve 29, the lower ends 40 of the slots serving as stop abutments. By the use of the foregoing arrangement, it will be perceived that the inoperative position of the platform 24 is determined by coaction between the stop pin 34 and the stop plate 36. The operative position, on the other hand, is determined by coaction between the stop pin 35 and the abutments 40. Due to threaded engagement between the sleeve 29 and the lower body plate 12, the location of the abutments 40 relative to the plate 12 may be altered through the simple expedient of rotating the sleeve 29 and fixing it in position by means of lock nut 41. Thus the operative position of the platform 24 may be adjusted within fairly wide limits.

Provision is made for clamping the workpiece W against axial movement relative to the dies 20, 21 and 22 when the platform 24 is in its operative position while permitting the workpiece to rotate relative to such dies. This is achieved in the illustrative fixture 10 by the use of a rotatable clamping member in the form of a circular plate 42 (Fig. 1) having a concave underside 44 and an annular portion 45 adapted to press the workpiece W tightly against the platform 24, at the same time depressing these parts against the action of the biasing spring 30 and shifting the platform into its operative position. While the clamping pressure is sufficiently great to insure the maintenance of wide surface contact between the workpiece and the platform 24, such pressure is still low enough to permit relative rotation between the workpiece W and the platform 24. This action can, of course, be materially enhanced by the use of a suitable lubricant between the workpiece and the platform 24. Rotation of the latter is effectively precluded by coaction between the stop pin 35 and the slots 39 of the sleeve 29. Downward clamping pressure on the member 42 is derived in this instance from the use of a relatively heavy manually actuated lever 46 (Fig. 1) pivotally secured as at 48 to an upstanding column 49 carried by the lower body plate 12. The lever 46 extends outwardly from the fixture 10 over the upper body plate 11, terminating in a handle 46A. For the purpose of transmitting pressure from the lever 46 to the clamping plate 42 while leaving the same free to rotate with the workpiece W, resort may conveniently be had to the use of a ball thrust bearing 50 between these parts. The bearing 50 may assume any appropriate design and in the form shown comprises a series of balls 51 disposed for movement in a circular path and operatively associated with a circular thrust shoe 52. The latter, in turn, is pivotally connected to the lever 46 as by means of a link 54. With the foregoing construction, it will be appreciated that the workpiece W can be clamped or unclamped almost instantaneously merely by manipulation of the lever 46.

Means is provided for performing a metal working operation upon the entire outer periphery of the workpiece W while the same is securely clamped to the platform 24 and the latter is disposed in its operative position. This is accomplished in the present instance by mounting two of the threading dies for rotation about fixed axes and at the same time mounting the third threading die about an axis which is substantially parallel but bodily shiftable with respect to the other two axes. Accordingly, the die 20 is keyed or otherwise rigidly fixed upon a shaft 55 (Figs. 1, 2, 3 and 5) journaled in bearings 56 carried by the body plates 11, 12. The shaft 55 is preferably so located that the die 20 will project into the central aperture 19 of the plate 11 and also into one of the notches 26 of the platform 24 when the latter is in its operative position. By the same token, the die 21 is rigidly mounted upon a shaft 58 (Figs. 2, 3 and 5) journaled in bearings 59, 60 carried respectively by the upper and lower body plates 11, 12, the die 21 also being arranged to project into the aperture 19 and another of the notches 26 in the same manner as the die 20. The die 22, on the other hand, is freely journaled upon a shiftable member preferably comprising an eccentric 61 which is rigidly attached to an upright rock shaft 62 as by means of a pin 64. The eccentric 61 includes a boss 65 upon which the die 22 is rotatably mounted and a collar 66 integral with the boss for retaining the die 22 in position axially of the rock shaft. The shaft 62, in turn, is journaled in bearings 68, 69 located respectively in the upper and lower body plates 11, 12. By reason of actuating means in the form of a manual lever 70 rigidly secured to the shaft 62, the same may be rocked through a predetermined angle which is defined by the distance between a pair of mechanical stop abutments 71, 72. The latter, of course, respectively determine the engaged and the disengaged positions of the die 22 relative to the workpiece, since the eccentric mounting of the die 22 will cause it to move bodily toward or away from the platform 24 in response to rocking movement of the shaft 62.

Power for performing the metalworking operation may be applied to the fixture 10 either continuously or intermittently from any appropriate source merely by direct connection with upstanding portion 58A of the shaft 58. For example, the portion 58A may readily be coupled to the spindle of a drill press with the fixture 10 mounted on the worktable of the press below such spindle. However, it might be equally convenient to utilize a separate drive for the fixture 10, connecting the latter thereto by means of a grooved pulley 74 indicated in broken outline in Fig. 5. Power from the shaft 58, which rotates the die 21, may conveniently be applied to the shaft 55 for rotation of the die 20 through a simple chain and sprocket drive. The latter in this instance comprises a pair of sprocket wheels 75, 76 rigidly secured to the shafts 58 and 55, respectively, and connected by means of a chain 78. To permit the the chain 78 to clear the guide sleeve 29 of the platform 24, an idler sprocket 79 journaled on stub shaft 80 is incorporated into the drive.

While the operation of the fixture 10 will undoubtedly be readily apparent to those skilled in the art, a brief summary thereof might be appropriate at this point. Assume first that the fixture 10 be firmly mounted upon a supporting surface and that power is being applied to the shaft 58 causing the dies 21 and 20 to rotate continuously. Assume further that the platform 24 is in its upper or inoperative position. Under such circumstances, the first step comprises taking a blank workpiece W such as the one shown in Fig. 4 and placing it upon the platform 24 after applying a lubricant to the underside of the former. The clamping member 42 is then positioned on top of the workpiece W by lowering the lever 46, whereupon further downward pressure on the latter depresses work supporting platform 24 along with the workpiece until the stop pin 35 accosts the stop abutments 40. This arrests the downward motion of the platform 24 and leaves the same in its operative position. The foregoing action has taken place with virtually no contact between the workpiece and any of the threading dies. To initiate the threading operation, the actuating lever 70 is moved from its normal or disengaged position against the stop 72 toward its engaged position against the stop 71. This cams the die 22 radially inward against the outer periphery of the workpiece W, sliding the same along the platform 24 and subjecting the workpiece to radial compression from all three of the dies. Thus, in addition to serving as a working die in its own right, the freely rotatable die 22 performs the function of and is, in effect, a pressure member which forces the workpiece W into engagement with the driven dies 20, 21. With the application of continued pressure on the lever 70, the workpiece W, the die 22, and the two power driven dies 20, 21 all rotate at the same peripheral speed. Even though the fixture 10 is not equipped with a mechanism for maintaining the rotary movements of the freely rotatable die 22 in synchronization at all times with the power driven dies 20, 21, the helical swaging ridges on the freely rotatable die immediately mesh with the incipient thread grooves formed on the periphery of the workpiece W when the dies are pressed against the workpiece. Moreover, the resulting coordinated action of all the dies with the workpiece W, whereby the swaging ridges of each die are caused to roll in and enlarge the incipient grooves in the workpiece, is clearly evinced by the smoothness and regularity with which the threads are formed in the workpiece. However, the exact manner in which the swaging ridge of the freely rotatable die 22 is effectively synchronized with the incipient thread of the workpiece W as an incident to the initiation of a production operation, is not wholly understood from a theoretical standpoint. Without any intention of limiting the invention to any particular theory of operation, it is postulated that the action taking place is attributable to one or more of several different factors which may act in conjunction with each other. For example, it is quite likely that there is some slippage induced between the workpiece W and the various dies whereby the freely rotatable die 22 gains or loses in its peripheral speed relative to the peripheral speed of the driven dies 20, 21, to draw the freely turning die into rotary synchronization with the latter dies. Another factor possibly is the induction of a slight vertical bending of the peripheral edge sections of the workpiece adjacent the dies whereby the workpiece threads swing toward mating engagement with die threads. Not to be overlooked in this connection is the three-point engagement between the workpiece W and the swaging dies, considered collectively. This circumstance taken in conjunction with the fact that the platform 24 and the clamping member 42 together exert a resilient or yieldable grip on the workpiece W is conducive to a slight tilting of the workpiece relative to the support surface of the platform 24 to facilitate axial alinement of the incipient workpiece threads with each of the three dies.

During continued rotation of the swaging dies 20, 21, and 22 after initiation of a swaging operation the ridged convolutions of these dies bite deeper and deeper into the outer periphery of the workpiece W and, by the time the lever 70 has reached its fully engaged position against the stop 71, a finished thread has been formed in the outer periphery of the workpiece. The lever 70 is thereupon shifted back to its disengaged position against the stop 72 to release the radial pressure on the workpiece and this is followed by elevation of the clamping lever 46. As a result, the platform 24 moves upward into its inoperative position in response to the action of the biasing spring 30, presenting a finished workpiece for ejection from the fixture.

It can now be appreciated that the arrangement just described constitutes a very simple and inexpensive solution to a difficult machining problem. The need for costly lathe set-ups is completely eliminated and, if necessary, the fixture 10 can be used in shops having very little machine tool equipment. The fixture is also susceptible of operating at great speed, thus insuring high production. For example, by the use of a manually operated fixture closely similar to the one described herein it has been possible to obtain a daily production rate in the neighborhood of 1600 workpieces. By the simple expedient of adding an automatic feeding and ejection arrangement it would be possible to obtain even greater production from this fixture. Over and above the foregoing, the fixture 10 is capable of turning out work demanding considerable accuracy and, as already pointed out, can easily be adapted to perform other metalworking operations besides threading.

I claim as my invention:

1. A centerless metalworking fixture for machining the outer periphery of a substantially solid disk-shaped workpiece, said fixture comprising the combination of a frame, a work supporting platform housed within said frame and axially movable between an operative and an inoperative position, a clamping member for holding the workpiece against said work supporting means, means for applying pressure to said clamping member, a pair of rotary dies drivingly journaled in said frame for rotation about fixed axes substantially parallel to the direction of movement of said work supporting platform, a rock shaft journaled in said frame, a third rotary die eccentrically journaled on said rock shaft for rotation about an axis substantially parallel to said fixed axes, all of said dies being substantially coplanar with the top surface of said platform when the same is in its operative position, said third die having an engaged position adjacent said platform and a disengaged position away from said platform, and actuating means for imparting angular movement to said rock shaft, said third die being adapted to move bodily between its engaged and disengaged positions in response to said angular movement of said rock shaft.

2. In a centerless metalworking fixture for threading the outer periphery of a substantially solid disk-shaped workpiece, the combination comprising a work support having an operative and an inoperative position, a clamping member, said member being adapted to engage a face of the workpiece and thus hold the latter against said work support, means for applying pressure to said clamping member, a pair of power driven rotary dies journaled for rotation about fixed axes substantially parallel to the direction of movement of said work support, a rock shaft, a third rotary die eccentrically journaled on said rock shaft for rotation about an axis substantially parallel to said fixed axes, all of said dies being substantially coplanar with said work support when the latter is in its operative position, said third die being adapted to move bodily between an engaged position adjacent said support and a disengaged position away from said support in response to angular movement of said rock shaft, and actuating means for imparting angular movement to said rock shaft.

3. In a centerless fixture for rolling threads into the outer periphery of a substantially solid disk-shaped workpiece, the combination comprising a circumferentially notched platform adapted to support the workpiece in underlying relation with one face thereof, said platform having an operative and inoperative position, a clamping member engageable with the other face of the workpiece, means for applying pressure to said clamping member, said means being adapted to urge said workpiece against said platform and to move said platform into its operative position, a pair of rotary threading dies journaled upon fixed axes and located so as to project into the circumferential notches of said platform when the latter is in its operative position, means for continuously driving said pair of dies, a rock shaft, an eccentric rigidly fixed to said rock shaft, a third rotary threading die freely journaled on said eccentric for rotation about an axis substantially parallel to said fixed axes, said third die having an engaged position wherein the same projects into one of the circumferential notches of said platform so as to subject the workpiece to radial compression against all of said threading dies, said third die also having a disengaged position clear of the workpiece, and actuating means for imparting angular movement to said rock shaft for shifting said third die between said positions.

4. In a centerless fixture for machining the outer peripheral surface of a substantially solid disk-shaped workpiece, the combination of a frame, machining dies drivingly mounted within said frame, a work supporting platform housed within said frame and being shiftable between an operative position adjacent the general plane of said dies and an inoperative position away from the general plane of said dies, a clamping member for holding the workpiece against said platform so as to preclude relative axial movement while permitting relative rotation therebetween, and common means for applying pressure to said clamping member and for shifting said platform into said operative position.

5. In a centerless fixture for threading the outer peripheral surface of a substantially solid disk-shaped workpiece, the combination comprising a frame having a central aperture, threading dies journaled in said frame, driving means interconnected with said dies for causing rotation thereof, a work supporting platform mounted for movement axially of the central aperture between an operative position and an inoperative position, a plunger integral with said platform and depending therefrom, an upstanding sleeve adjustably mounted in said frame, said sleeve being adapted to slidably house the lower end portion of said plunger and thereby guide said platform in its movement, a spring interposed between the end of said plunger and said sleeve for urging said platform toward the inoperative position, stop abutments mounted respectively on said plunger and said frame for defining the inoperative position of said platform, and additional stop abutments carried respectively by said plunger and said sleeve for defining the operative position of said platform, certain of said additional stop abutments being adapted to preclude rotation of said platform.

6. A centerless fixture for rolling threads along the entire outer periphery of a substantially solid disk-shaped workpiece, said device comprising, in combination, a frame including upper and lower body plates rigidly assembled in spaced-apart parallel relation, said upper body plate having a central aperture, a non-rotatable work supporting platform housed within the central aperture and movable axially thereof between an operative and an inoperative position, spring means for biasing said platform toward its inoperative position, a clamping member adapted to engage the upper face of the workpiece and clamp the latter to said platform, a manual lever for applying clamping pressure to said clamping member, said lever being adapted to depress the workpiece and said platform to the latter's operative position against the action of said biasing spring means, a ball thrust bearing disposed between said lever and said clamping member, a pair of rotary threading dies drivingly journaled in said body plates for rotation about fixed axes substantially parallel to the direction of movement of said platform, a rock shaft journaled in said body plates, an eccentric rigidly secured to said rock shaft, a third rotary threading die journaled on said eccentric, all of said dies being substantially coplanar with said work supporting platform in its operative position, and a manual actuating lever rigidly fixed to said rock shaft for moving the same through a predetermined angle and thereby shifting said third threading die toward or away from said platform and the workpiece.

7. A centerless fixture for forming threads along the entire outer periphery of a substantially solid disk-shaped workpiece, said device comprising, in combination, a frame having a central aperture, a work supporting platform housed within the central aperture and movable axially thereof between an operative and an inoperative position, spring means for biasing said platform toward its inoperative position, a clamping member adapted to engage the upper face of the workpiece and clamp the latter to said platform, lever means for applying pressure to said clamping member, said lever means being adapted to depress the workpiece and said platform to the latter's operative position against the action of said biasing spring means, a pair of threading dies drivingly journaled in said frame for rotation about fixed axes substantially parallel to the direction of movement of said platform, a rock shaft journaled in said frame, an eccentric rigidly secured to said rock shaft, a third threading die journaled on said eccentric, and a manual actuating lever rigidly fixed to said rock shaft for moving the same through a predetermined angle and thereby shifting said third threading die toward or away from said platform and the workpiece.

JACOB W. LEWIN.

REFERENCES CITED

The following references are of record in the file of this patent:

UNITED STATES PATENTS

| Number | Name | Date |
|---|---|---|
| 88,885 | Mason | Apr. 13, 1869 |
| 139,246 | Hinkley | May 27, 1873 |
| 220,224 | Everson | Oct. 7, 1879 |
| 492,571 | Clatworthy | Feb. 28, 1893 |
| 1,500,261 | Page | July 8, 1924 |
| 2,145,587 | Draper | Jan. 31, 1939 |
| 2,189,004 | Harwood | Feb. 6, 1940 |
| 2,242,662 | Shera | May 20, 1941 |
| 2,264,060 | Whyte | Nov. 25, 1941 |